United States Patent
Suzuki et al.

(10) Patent No.: US 7,255,497 B2
(45) Date of Patent: Aug. 14, 2007

(54) UNIDIRECTIONAL OPTICAL POWER MONITOR

(75) Inventors: Masaru Suzuki, Mohka (JP); Takeshi Satoh, Mohka (JP); Nobuhiro Ueno, Oyama (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 10/572,792

(22) PCT Filed: May 24, 2005

(86) PCT No.: PCT/JP2005/009404

§ 371 (c)(1),
(2), (4) Date: Mar. 21, 2006

(87) PCT Pub. No.: WO2005/124415

PCT Pub. Date: Dec. 29, 2005

(65) Prior Publication Data

US 2007/0036491 A1    Feb. 15, 2007

(30) Foreign Application Priority Data

Jun. 15, 2004  (JP) .............................. 2004-177175

(51) Int. Cl.
*G02B 6/255* (2006.01)
*G02B 6/42* (2006.01)
*G02B 6/32* (2006.01)
*G02B 6/36* (2006.01)

(52) U.S. Cl. ........................... 385/93; 385/17; 385/33; 385/78

(58) Field of Classification Search ................ 385/17, 385/18, 48, 78, 79, 89, 92–94, 33
See application file for complete search history.

(56) References Cited

U.S. PATENT DOCUMENTS 6,454,465 B1 * 9/2002 Uschitsky et al. ............ 385/79

(Continued)

FOREIGN PATENT DOCUMENTS

JP            64-80917 A       3/1989

(Continued)

OTHER PUBLICATIONS

Masahiro Kawasugi et al.; "Hikari Bunki Kino Tsuki PD Module no Takinoka", The Institute of Electronics, Information and Communication Engineers Sogo Taikai Koen Ronbunshu Electronics 1, Mar. 7, 2002; p. 183.

(Continued)

*Primary Examiner*—Michelle Connelly-Cushwa
*Assistant Examiner*—Rhonda S. Peace
(74) *Attorney, Agent, or Firm*—Sughrue Mion, PLLC

(57) ABSTRACT

A small-sized uni-directional optical power monitor with an excellent directional characteristic is disclosed. The monitor comprises: a GRIN lens having a tap film for transmitting and reflecting an optical signal from an input and an output optical fiber with a predetermined ratio; and a photodiode having a lens for detecting and measuring part of the optical signal that has transmitted through the tap film. The tap film of the GRIN lens is connected to the photodiode by an opaque black sleeve having two continuous circular holes serving as an internal optical path between them. The two circular holes are parallel to each other, their center axes are shifted from each other, and the two circular holes communicate each other through a through-hole at the sleeve intermediate position. The portion of the optical signal coming from one of the optical fibers and transmitting through the tap film passes through the two circular holes and the through-hole and is detected by the photodiode. Since one of the circular holes has a vertical wall at the sleeve intermediate position, an optical signal coming from the other optical fiber and transmitting through the tap film is obstructed by the wall and is not measured by the photodiode.

4 Claims, 5 Drawing Sheets

U.S. PATENT DOCUMENTS

| | | |
|---|---|---|
| 6,603,906 B2 | 8/2003 | Qin et al. |
| 6,749,347 B1 | 6/2004 | Ichihara et al. |
| 2002/0118920 A1* | 8/2002 | Francis et al. ................ 385/33 |

FOREIGN PATENT DOCUMENTS

| | | |
|---|---|---|
| JP | 11-64687 A | 3/1999 |
| JP | 2001-281501 A | 10/2001 |
| JP | 2002-311293 A | 10/2002 |
| JP | 2003-202262 A | 7/2003 |

OTHER PUBLICATIONS

U.S. 6,749,347 is the U.S. equivalent.

* cited by examiner

UNIDIRECTIONAL OPTICAL POWER MONITOR

TECHNICAL FIELD

The present invention relates mainly to an optical power monitor for use in optical communication field.

BACKGROUND ART

Information and communication technology (ICT) innovation has recently had remarkable growth and development and is shifting toward optical signal communications from electric signal communications in order to accommodate needs of higher communication speed and increasing amount of information with proliferation of the Internet. Many trunk cables, collecting much information from various relay points, are being replaced with optical cables, thus having remarkably improved processing speed. Because communications between the optical cables and users' terminals will be reviewed from this time forward, the demand for more inexpensive and comfortable environmental arrangement of information and communication technologies is increasingly intensifying.

With the enhancement of optical communication networks, delivery and receipt of much information have been possible to make at higher speeds. Accordingly, development of new applications is on the rise and the amount of information being exchanged through optical communication networks has been further increased. To increase the amount of information to be processed by optical fibers, there has been presently used a technology for increasing quantity of signals per unit time by using high-frequency signals and simultaneously transmitting signals having various wavelengths about different types of information through one optical fiber, which is called a wavelength multiplexing system. For formation of a precise and highly reliable communication network, it is necessary to ensure multidirectional connection to a plurality of paths and use of a plurality of optical fibers is essential from the viewpoint of maintenance.

For formation of an optical communication circuit for transmitting a great many signals through an optical fiber, a Wavelength Division Multiplex (hereinafter referred to as "WDM") system is essential which divides optical signals subjected to wavelength multiplexing into respective wavelengths, and instead multiplexes optical signals of different types of wavelengths, and further branches or inserts optical signals. Accordingly, the amount of information has been increased and the importance of information to be handled has been more significant. If an optical signal has some fault, it is necessary to promptly grasp where and which optical signal has the fault and to verify optical signal intensity as needed in addition to presence of optical signal connection. Moreover, if a transfer distance is long, the optical signal intensity attenuates, which requires an Erbium Doped Fiber Amplifier, hereinafter referred to as "EDFA" for amplifying the optical signal. EDFA needs to exactly grasp the intensity of an optical signal inputted from the outside for evaluation of an amplification ratio and the intensity of an optical signal outputted to the outside after the amplification. Consequently, to develop an optical communication system with high reliability, such a precise monitoring function is indispensable.

The WDM system has fixed input and output directions of optical signals. Monitoring of the optical signals has required no particular directivity. On the other hand, the EDFA receives pump laser and propagates it in a special fiber for amplification of the optical signals. Accordingly, the amplified optical signals sometimes have their backflows and, to exactly determine the amplification level of the optical signals, a function is essential which detects only the optical signal from input fiber and will not detect the light returned from an output fiber.

A conventional monitoring method for general optical signals uses a technology which branches part of the optical signals with a photocoupler and detects the branched optical signals with a photodiode. Accordingly, fused connection of each component is required, which causes interference with reduction in mounting manpower. Moreover, the photocoupler has a structure which branches optical signals by approaching cores serving as optical signal propagating sections of optical fibers and the length of the approaching section is one of key parameters of a branching amount. This makes it difficult to miniaturize each of products, thus impairing reduction in component sizes. Recently, there are strong needs for downsizing the EDFA apparatus and no reduction of component size leads to restrictions on the miniaturization and high package density of the EDFA apparatus.

Patent Document 1 discloses an example of a bi-directional optical power monitor miniaturized for easy handling. FIG. 6 is a structure of the disclosed monitor. A multi-capillary glass ferrule 53 (equivalent to a pig tail fiber) having two optical fibers 51, 52, respectively (an input optical fiber 51 and an output optical fiber 52, respectively) and GRIN (Gradient Index) lens 54 are made to face each other through an air gap 55 with a predetermined length. On an end surface of the GRIN lens, a filter 56 (equivalent to a tap film) is provided to permit the light passing through the GRIN lens to reflect and penetrate. The light transmitting through the filter passes through an air gap 57 and is converted into an electric signal by a photon detector 58 (corresponding to a photodiode) to measure the intensity of the light inputted into the optical fiber. The multi-capillary glass ferrule 53 and the GRIN lens 54 are retained with glass tubes 60, 61. Because both the two optical fibers 51, 52 permits light inputs and outputs, this apparatus may be called a bi-directional optical power monitor. The GRIN lens is a glass column of which refraction factor varies radially and continuously toward the outer-periphery direction from the center line. The refraction factor becomes larger as it is nearer to the outer periphery, and as the light expands widely to the outer periphery, the traveling direction of the light is biased in the center line direction, so that the penetrating light gathers around the filter center.

The light incident into the air gap 55 from the input optical fiber 51, passing through the GRIN lens 54, reaches the filter 56 on the end surface of the GRIN lens. Most of the light which has reached the filter 56 reflects, passes through the GRIN lens 54 and the air gap 55 and enters the output optical fiber 52 to produce output light. Part of the light which has reached the filter 56 transmits through the filter 56, passes through the air gap 57, enters the photon detector 58 and is converted into an electric signal for output. Such a series of optical paths are indicated by solid-line arrows. On the contrary, when the light is entered from the output optical fiber 52, it has the same passage as the above-described optical path, so that the light can be removed from the input optical fiber 51. The light which has penetrated through the filter 56 passes through the air gap 57, enters the photon detector 58 and is converted into an electric signal for output. Such a series of optical paths are indicated by broken-line arrows.

Non-patent Document 1 discloses an example of an optical power monitor having uni-directionality. FIG. 7 illustrates a structure of the disclosed power monitor. The names of parts use those used in Non-patent Document 1. A two-core ferrule 80 (equivalent to a pig tail fiber) having two of an input optical fiber 81 and an output optical fiber 82 called as a port 1 and a port 2 respectively is butted against a GRIN lens 83. On an end surface of the GRIN lens 83, a dielectric mirror 84 (equivalent to a tap film) is formed to conduct reflection and transmission of light. The center line of the GRIN lens is disposed, shifted from that of the photo-detector 85 (equivalent to a photodiode).

The following is an explanation of an optical flow. The light (input light) incident from the input optical fiber 81 (port 1) passes through GRIN lens 83 and reflects and penetrates using the dielectric mirror 84. The reflected light passes through the GRIN lens and enters the output optical fiber 82 (port 2) to produce output light. The light, which has transmitted through the dielectric mirror, enters a photo-detector 85, is converted into an electric signal and outputted as an electric signal. Such a series of optical paths are indicated by solid-line arrows. Next, the light coming from the output optical fiber 92 (port 2) will be described below. The light coming from the output optical fiber 82 passes through the GRIN lens 83 and is reflected by and is made to transmit through the dielectric mirror 84. The reflected light passes through the GRIN lens again and enters the input optical fiber 81 (port 1) to become the output light. The light, which has transmitted through the dielectric mirror, does not enter the photo-detector 85 but is discharged to the outside because the optical axis (center line) of GRIN lens is shifted from the optical axis (center line) of the photo-detector 85. Accordingly, the intensity of the incoming light from the output optical fiber 82 (port 2) is impossible to measure. Such a series of optical paths are indicated by broken-line arrows. In other words, there is used an optical power monitor which has uni-directionality, that is, the following phenomenon: the intensity of the incoming light from the input optical fiber 81 (port 1) is possible to measure and the intensity of the incoming light from the output optical fiber 82 (port 2) is not possible to measure.

In the directional characteristic of the uni-directional optical power monitor, a ratio of the optical sensitivity A (μA/w) of an photodiode obtained when light is inputted from the input optical fiber to the optical sensitivity B (μA/w) of an photodiode obtained when the same light is inputted from the output optical fiber is expressed as a unit of dB and determined from the directional characteristic=10 $\log_{10}(A/B)$. The uni-directional optical power monitor requires a directional characteristic of at least 25 dB.

For the uni-directional optical power monitor illustrated in FIG. 7, a positional relationship between the optical axis of the GRIN lens and the optical axis of the photodiode is described, however, a detailed structure of the optical path between the GRIN lens and the photodiode is not described. The uni-directional optical power monitor requires to position and fix the GRIN lens and the photodiode with a sleeve or the like. If the GRIN lens approaches the photodiode too much, even the light transmitted from any optical fiber is detected, therefore the GRIN lens should be distant from the photodiode by at least a certain distance.

Patent Document 1: U.S. Pat. No. 6,603,906

Non-patent Document 1: Preprint, Lecture No. C-3-51, page 183, FIG. 3, for the Institute of Electronics, Information and Communication Engineers in Japan held on Mar. 28, 2002

DISCLOSURE OF THE INVENTION

An object of the present invention is to provide a small-sized uni-directional power monitor with an excellent directional characteristic having an input optical fiber and an output optical fiber, in which an optical sensitivity for optical signal incident from the input optical fiber is superior, but an optical sensitivity for optical signal coming from the output optical fiber is low.

A uni-directional optical power monitor according to the present invention comprises:

a pig tail fiber having two optical fibers parallel to each other and at a small distance from each other, of which open ends are adjacent to a center of an end surface of the pig tail fiber on the end surface;

a columnar GRIN lens having two end surfaces opposing to each other, of which one faces to the end surface of the pig tail fiber and the other has a tap film on it;

a sleeve provided with a first end and a second end, the sleeve having a first circular hole being continuous from the first end approximately to an intermediate position between the first end and the second end, and a second circular hole that is continuous from the second end approximately to the intermediate position and has a center axis shifted from a center axis of the first circular hole, the first circular hole having a through-hole communicating with the second circular hole and an intermediate wall approximately at the intermediate position; and a photodiode positioned at the second end of the sleeve in the second circular hole and having a lens, on a front face of the photodiode, facing to the through-hole. The GRIN lens is positioned in the first circular hole such that an optical signal, which comes from one of the two optical fibers and transmits through the tap film, proceeds through the first and the second circular holes and reaches the photodiode and that an optical path of an optical signal coming from the other of the two optical fibers and transmitting through the tap film is obstructed by the intermediate wall of the sleeve.

In the uni-directional power monitor of the present invention, the sleeve has the first circular hole and the second circular hole having the center axis that is eccentric from the center axis of the first circular hole. Since the columnar GRIN lens is positioned at the first end of the sleeve in the first circular hole and the photodiode having a lens is disposed at the second end of the sleeve in the second circular hole, an optical axis of the columnar GRIN lens is shifted from an optical axis of the photodiode having a lens, that is, an optical axis of the lens disposed on the front face of the photodiode, at an eccentric distance corresponding to the center distance between the first circular hole and the second circular hole.

An optical signal coming from an optical fiber, which may be referred to as an "input optical fiber", of the two optical fibers radiates into an air gap between the pig tail fiber and the GRIN lens at an open end of the optical fiber, and enters the GRIN lens, expanding its beam radius. In the GRIN lens, the optical signal reaches the tap film, when the optical signal becomes to approximately parallel beam by change of the light proceeding direction, and reflects from and partially transmits through the tap film at a predetermined ratio. The light reflected at the tap film passes the GRIN lens again, proceeds, converging its beam radius, and radiates into the gap. After that, the light focuses on an open end of the other optical fiber, which may be referred to as an "output optical fiber", and the light coming from the input optical fiber is transmitted to the output optical fiber. On the other hand, a light transmitting through the tap film enters, through the first circular hole of the sleeve and the through-hole and through the second circular hole, into the photodiode with a lens fixed and having an optical axis eccentric from an optical axis of the GRIN lens, and the amount of the light that has entered into the monitor from the input optical fiber can be measured.

By contrast, the light that has entered from the other optical fiber of the two optical fibers emits into the air gap and then enters the GRIN lens. The proceeding direction of the light is changed in the GRIN lens and into an approximately parallel light, and the light is reflected and transmitted at a predetermined ratio by the tap film. A light reflected by the tap film is connected to the input optical fiber through a path of the GRIN lens and the air gap. A light transmitting through the tap film proceeds in the direction symmetric with respect to the center line of the GRIN lens and is reflected by an approximately vertical intermediate wall disposed in back of the first circular hole - - - at an approximately intermediate position - - - in the sleeve to be attenuated and to change the proceeding direction. After then, the light further repeatedly reflects from an inside wall parallel to the first circular hole and is attenuated, and returns in the direction of the GRIN lens and hardly enters the photodiode having a lens.

The sleeve for the uni-directional optical power monitor according to the present invention may be made of an opaque black ceramic, glass or plastic. By composing the sleeve by an opaque material, mutual interference among a plurality of optical power monitors can be avoided, and directional characteristic of an optical power monitor can be improved. Also, it is desirable for labor safety.

A black material is more desirable for the sleeve among the opaque materials. Since the black material, in general, has a low reflectivity, the light coming from the output optical fiber can be attenuated almost to zero by repeatedly reflecting on the inside wall or inside circular surface. For the black material, ceramic, glass or plastic may be used. Alumina, zirconia, silicon carbide, silicon nitride, aluminum nitride, soft ferrite and hard ferrite may be suitable for the black ceramic. As the black glass material, those made of silica, alumina or titania and composite material of them can be used. For the black plastic, epoxy resin, liquid crystal polymer, polyphenylene resin, polyethylene resin, polypropylene resin, polybutylene resin, azo-compound resin and polyester resin are suitable. Also, carbon-series material can be expected to have a similar effect high enough to be used. When soft ferrite or hard ferrite is used, it is expected that uni-directional power monitors of the present invention can be aligned or easily attached to a magnet or magnetic material.

The uni-directional optical power monitor of the invention preferably satisfies the following equation:

$$D \geq 2L \geq 1.517R + D/2,$$

where L is an axial distance between an optical axis of the GRIN lens and an optical axis of the photodiode, R is the Gauss beam radius of the light transmitting through the tap film and D is a lens diameter of the photodiode having a lens.

A light does not exhibit a uniform intensity on a vertical cross section of the light beam, but the light is strongest in the center of the light beam and has such a distribution that the light is reducing in a radial direction of the beam. The distribution is referred to as "Gauss distribution", which is a function of a proceeding direction of the light beam. Because of the Gauss distribution, the beam is gradually expanding as its proceeding and is being attenuated simultaneously. It is known that the Gauss distribution is maintained on any cross section vertical to the beam proceeding direction. Although the intensity of the beam can be obtained by electrically converting the light at the site, it is necessary to have an index relative to an extent of the beam expanding. Therefore, a radius, at which a light intensity is attenuated to $1/e^2$ of the center intensity of the light, is the index showing a beam expanding size that is called "Gauss beam radius", where "e" is the base of a natural logarithm.

It is necessary for the uni-directional optical power monitor of the present invention that only a light coming from an optical fiber and transmitting through the tap film is measured by a photodiode, while a light coming from the other optical fiber and transmitting through the tap film is not measured by the photodiode. In order to accomplish this, an optical axis distance between an optical axis of a GRIN lens and an optical axis of the photodiode is important. A position, at which a light intensity reduces to 1% of the center intensity of the beam, can be calculated by the Gauss beam radius multiplied by 1.517. It is desirable that twice of the optical axis distance is made larger than the sum of 1.517 times the Gauss beam radius plus a half of the lens diameter of the photodiode, in order to position the GRIN lens and the photodiode in such a relationship that a light reduced to 1% does not enter the photodiode having a lens. By establishing the relationship, when an output of the photodiode by a light coming from the input optical fiber is referred to as "output A", and when an output of the photodiode by a light coming from the output optical fiber is referred to as "output B", it becomes possible to make the output B smaller than the output A with a difference of two or more digits.

On the other hand, it is desirable that the optical axis distance L is made smaller than a half of the lens diameter D of the photodiode. If the optical axis distance L becomes more than a half of the lens diameter D of the photodiode, optical sensitivity sharply decreases and the outside diameter of the sleeve to be used should be increased, resulting in inconvenience of handling and difficulty in manufacturing.

ADVANTAGES OF THE INVENTION

The present invention has provided a small-sized and superior uni-directional power monitor with an enhanced directional characteristic. And, since the uni-directional optical power monitor according to the present invention has a sleeve made of a black opaque material, by which a GRIN lens and a photodiode are fixed with eccentric optical axes, the portion of the optical signal coming from an output optical fiber and transmitting through a tap film is attenuated by a sleeve inside wall to improve the directional characteristic.

EXPLANATION OF NUMERAL REFERENCES

Figure 1:
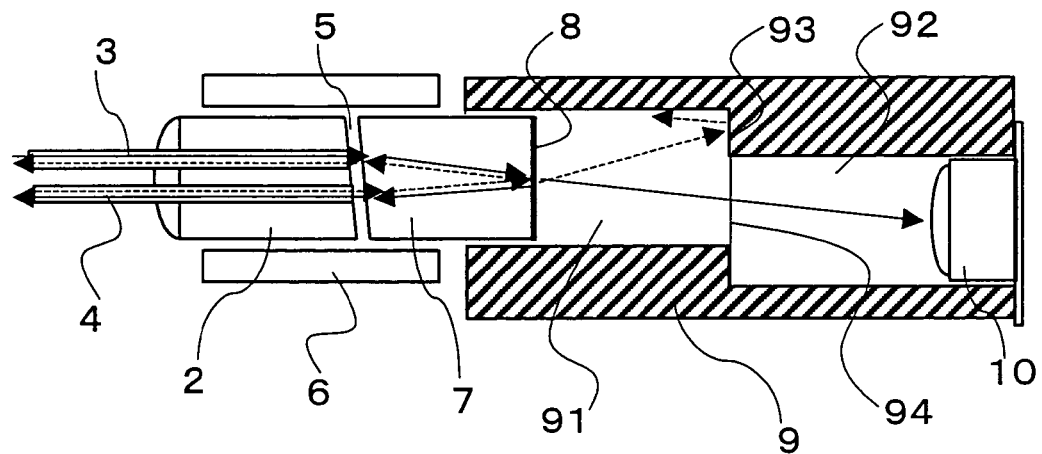
FIG. 1 is a cross-sectional drawing showing a uni-directional optical power monitor of EXAMPLE 1 according to the present invention.

2 Pig tail fiber
3 (Input) Optical fiber
4 (Output) Optical fiber
7 GRIN lens
8 Tap film
9 Sleeve
10 Photodiode
91 First circular hole
92 Second circular hole
93 Intermediate wall
94 Through-hole

BEST MODE FOR CARRYING OUT OF THE INVENTION

EXAMPLE 1

FIG. 1 is a cross-sectional drawing showing a uni-directional optical power monitor of EXAMPLE 1 according to the present invention. The uni-directional optical power monitor comprises: a pig tail fiber 2 having two optical fibers (input) optical fiber 3 and output optical fiber 4); a columnar GRIN lens 7 having a tap film 8; a photodiode 10; and a sleeve 9 formed with an optical path between the GRIN lens and the photodiode. The two optical fibers 3, 4 are disposed in parallel to each other at a small interval (a pitch between the two optical fibers: approx. 250 μm) and molded to form the pig tail fiber 2. On one end surface of the pig tail fiber 2, the two optical fibers 3, 4 have an open end around the center thereof, respectively. The columnar GRIN lens 7 has two end surfaces facing each other, of which one faces the end surface of the pig tail fiber having the two open ends of the two optical fibers with a small air gap 5 (100 to 300 μm) and the other has a tap film 8 thereon. The pig tail fiber 2 and the columnar GRIN lens 7 have their axes substantially positioned in line. The end surface of the pig tail fiber facing the GRIN lens and the end surface of the GRIN lens facing the pig tail fiber have an inclination angle of approx. 8° to the optical axis respectively, thus preventing reflection at their facing surface.

The GRIN lens refers to a gradient index lens and has a refractive index which becomes continuously larger from its center axis toward outer periphery. The light traveling in parallel to the center axis of the lens at a position distant from the center axis of the GRIN lens is bent in the center direction of the lens, and the light incident from one end surface of the GRIN lens goes out from around the center of the other. The refractive index in the center axis of the GRIN lens 7 used herein is 1.590 and a refractive index gradient constant is 0.326. The tap film 8 provided on the GRIN lens end surface is a dielectric multilayer film formed by periodically layering $SiO_2$ and $TiO_2$ and a tap percentage indicating an optical transmittance is 1%. Most of the light which reaches the tap film after transmitting through the GRIN lens is reflected on a surface of the tap film and a part of the light transmits through the tap film.

In this embodiment, the pig tail fiber 2 and the GRIN lens 7 are 1.8 mm in diameter and fixed, with epoxy resin adhesives, inside the through-hole in a tube 6 composed of an opaque and black cylindrical glass of 2.8 mm in outside diameter and 1.9 mm in inside diameter. In fixing the pig tail fiber 2 and the GRIN lens 7 inside the through-hole in the tube 6 with the small air gap 5, while an optical signal coming from one optical fiber of the pig tail fiber and going out from the other optical fiber is being monitored by an optical multimeter, a magnitude of the air gap 5 is adjusted so that the intensity of the optical signal may become largest.

The sleeve 9 formed with an optical path between the GRIN lens 7 and the photodiode 10 has a first end and a second end, which include a first circular hole 91 opened from the first end approximately to an intermediate position between the first end and the second end and a second circular hole 92 opened from the second end approximately to the intermediate position, respectively. The second circular hole 92 is eccentric from the first circular hole 91 and the first circular hole 91 has an intermediate wall 93 and a through-hole 94 connected with the second circular hole at its deep end, namely, approximately at the intermediate position. In this embodiment, the sleeve 9 is made of black alumina ceramics. A length of the sleeve 9, or a length from the first end to the second end is 14.0 mm. The first circular hole and the second circular hole are 2.0 mm in inside diameter, and the center axis of the first circular hole and the center axis of the second hole are parallel to each other and is a center axis distance of 0.9 mm. A distance from one end of the sleeve approximately to an intermediate position is 7.0 mm. Within a plane perpendicular to the center axis of the first circular hole approximately at the intermediate position, there are the through-hole 94 and the intermediate wall 93. An end portion of the GRIN lens 7 on the side where the tap film of the GRIN lens 7 is provided is inserted into the first circular hole by 2.0 mm from the first end of the sleeve and fixed with adhesives. A distance between the tap film 8 of the GRIN lens 7 and the intermediate wall 93 is 5.0 mm.

The photodiode 10 (2.0 mm in diameter) having a lens (1.9 mm in diameter) on its front end is inserted into the second circular hole from a second end of the sleeve for fixing. A photoelectric conversion element of the photodiode uses InGaAs with high sensitivity in an optical communication waveband. A distance from the approximately intermediate position to the lens front end of the photodiode 10 is 5.0 mm in the second circular hole.

By this uni-directional optical power monitor, an optical signal coming from the optical fiber 3 is transmitted to the GRIN lens 7 from the open end of the optical fiber 3 positioned at the end of the pig tail fiber 2 and most of the optical signal reflects by the tap film 8 provided on the tip of the GRIN lens 7 and passes through the optical fiber 4 to be transmitted. A part of an optical signal which comes from the optical fiber 3 and reaches the tap film 8 transmits through the tap film and passes through the second circular hole 92 via the through-hole 94 from the first circular hole 91 as indicated by the solid-line arrows, and its intensity is detected by the photodiode 10.

Most of optical signals coming from the optical fiber 4 are reflected by the tap film 8 positioned at an end of the pig tail fiber 2 and transmitted through the optical fiber 3. A part of optical signals which come from the optical fiber 4 and reach the tap film 8 transmit through the tap film, however, the transmitted optical signals hit the intermediate wall 93 at the deep end of the first circular hole 91 as indicated by broken-line arrows, where most of the light are absorbed and a part thereof are reflected at the intermediate wall 93. Only the very little of the optical signals coming from the optical fibers 4 pass through the second circular hole 92 and reach the photodiode 10. As a result, of the optical signals coming from the optical fiber 3, the quantity of light measured by the optical power monitor is large, while of optical signals coming from the optical fiber 4, the quantity of light measured by the optical monitor is very small. In other words, the optical power monitor has excellent uni-directionality.

Evaluations are made on optical characteristics and electric characteristics of the uni-directional optical power monitor. When the light of which a wavelength is 1,550 nm and light intensity is 0 dBm is inputted from the optical fiber 3, insertion loss is 0.31 dB and optical sensitivity by the photodiode is 9.8 mA/w. When the same light is inputted from the optical fiber 4, the insertion loss is 0.31 dB and the optical sensitivity by the photodiode is 24.1 µA/w. The directionality characteristic of the uni-directional optical power monitor is 26.1 dB, which is more than a required level of 25 dB.

EXAMPLE 2

A uni-directional optical power monitor of EXAMPLE 2 according to the present invention has the following differences from the uni-directional optical power monitor of EXAMPLE 1 illustrated in FIG. 1: a distance between the two optical fibers 3, 4 mounted on the pig tail fiber 2 is 125 µm, a length of the sleeve 9 is 24 mm and a distance between the tap film 8 and the photodiode 10 with a lens is 20 mm. The other configurations of the uni-directional optical power monitor of EXAMPLE 2 are the same as those of the uni-directional optical power monitor of EXAMPLE 1 illustrated in FIG. 1.

In the uni-directional optical power monitor, an optical sensitivity of the photodiode obtained when an optical signal is inputted from the input optical fiber 3 is 6.7 mA/w. Because the uni-directional optical power monitor has a distance between the tap film and the photodiode with the lens longer than that of EXAMPLE 1, an optical beam transmitting through the tap film and traveling toward the photodiode spreads widely and the Gauss beam radius becomes larger than that in EXAMPLE 1, thus degrading the optical sensitivity from that of EXAMPLE 1.

An optical sensitivity of the photodiode obtained when an optical signal is inputted from the output optical fiber 4 is 20.6 µA/m, and the uni-directional optical power monitor can attain a directional characteristic of 25.1 dB. EXAMPLE 2 has a small distance between the two optical fibers, therefore an angle of an optical signal coming from the optical fibers and transmitting through the GRIN lens to the axis of the GRIN lens is small. However, because a distance between the tap film of the GRIN lens and the photodiode is long, an excellent directional characteristic can be achieved. However, EXAMPLE 2, having a small distance between the two optical fibers, requires a longer sleeve. To achieve an excellent directional characteristic, the optical power monitor inevitably requires a larger capacity.

EXAMPLE 3

A uni-directional optical power monitor of EXAMPLE 3 uses a GRIN lens which has a refractive index of 1.634 and a refractive index gradient constant of 0.417 in its center axis. The refractive index and the refractive index gradient constant are larger than those of the GRIN lens of EXAMPLE 1. The uni-directional optical power monitor using the GRIN lens having such high refractive index has a larger angle of the light coming from the input optical fiber 3 and transmitting through the GRIN lens to the light coming from the output optical fiber 4 and transmitting through the GRIN lens than that in EXAMPLE 1. Accordingly, a distance between the tap film and the photodiode with lens can be reduced to 8 mm, which is shorter than that of EXAMPLE 1. Moreover, high refractive index permits the light to converge rapidly within the GRIN lens, thereby reducing its Gauss beam radius and facilitating collection of the light through the photodiode with lens.

The optical sensitivity of the photodiode obtained when an optical signal is inputted from the input optical fiber 3 with the uni-directional optical power monitor is 10.2 mA/w, while the optical sensitivity of the photodiode obtained when an optical signal is inputted from the output optical fiber 4 with the uni-directional optical power monitor is 19.2 µA/w. A directional characteristic of the uni-directional optical power monitor is 27.3 dB, which is very satisfactory.

EXAMPLE 4

A uni-directional optical power monitor of EXAMPLE 4 uses a laminated film formed consisting of $SiO_2$ and $Ta_2O_5$ films in place of the tap film of the uni-directional optical power monitor of EXAMPLE 1. Its tap percentage is 1%, which is the same as for EXAMPLE 1. The other configurations of the uni-directional optical power monitor are the same as those of EXAMPLE 1. An optical sensitivity of the photodiode obtained when an optical signal is inputted from the input optical fiber with the uni-directional optical power monitor is 9.8 mA/w, while an optical sensitivity of the photodiode obtained when an optical signal is inputted from the output optical fiber with the uni-directional optical power monitor is 21.4 µA/w. A directional characteristic of the uni-directional optical power monitor is 26.6 dB. The EXAMPLE 4 indicates that the laminated film composed of $SiO_2$ and $Ta_2O_5$ films can be used as a tap film.

EXAMPLE 5

TABLE 1 shows optical sensitivity of a photodiode for an optical signal inputted from an input optical fiber, optical sensitivity of a photodiode for an optical signal inputted from an output optical fiber, measured directional characteristic and dark current with respect to each of optical power monitors M1 to M17 with only sleeve materials taken as each material shown in TABLE 1 in the uni-directional optical power monitor of EXAMPLE 1. Because the dark current is an output current of the photodiode under a state of no optical input from either of the input optical fiber or the output optical fiber, it means that the light incident from the outside through a sleeve wall was detected. In any optical power monitor, the dark current was 0.043 to 0.077 nA, which is satisfactorily under 0.1 nA.

TABLE 1

| Sample No. | Sleeve material | Optical sensitivity for optical signal incident from input optical fiber (mA/w) | Optical sensitivity for optical signal incident from output optical fiber (µA/w) | Directional characteristic (dB) | Dark current (nA) |
| --- | --- | --- | --- | --- | --- |
| M1 | Alumina | 9.80 | 24.1 | 26.1 | 0.043 |
| M2 | Zirconia | 9.90 | 22.3 | 26.5 | 0.055 |
| M3 | Silicon carbide | 10.20 | 20.5 | 27.0 | 0.048 |
| M4 | Silicon nitride | 10.10 | 18.5 | 27.4 | 0.062 |
| M5 | Aluminum nitride | 9.90 | 21.9 | 26.6 | 0.077 |

TABLE 1-continued

| Sample No. | Sleeve material | Optical sensitivity for optical signal incident from input optical fiber (mA/w) | Optical sensitivity for optical signal incident from output optical fiber (µA/w) | Directional characteristic (dB) | Dark current (nA) |
|---|---|---|---|---|---|
| M6 | Silica glass | 9.60 | 29.7 | 25.1 | 0.065 |
| M7 | Alumina glass | 9.80 | 28.5 | 25.4 | 0.063 |
| M8 | Titania glass | 10.00 | 29.1 | 25.4 | 0.072 |
| M9 | Epoxy resin | 10.10 | 25.3 | 26.0 | 0.046 |
| M10 | Liquid crystal polymer | 9.80 | 22.7 | 26.4 | 0.059 |
| M11 | Polyphenylene resin | 9.50 | 26.2 | 25.6 | 0.056 |
| M12 | Polyethylene resin | 9.40 | 24.8 | 25.8 | 0.049 |
| M13 | Polypropylene resin | 10.20 | 23.3 | 26.4 | 0.044 |
| M14 | Polybutylene resin | 9.70 | 26.3 | 25.7 | 0.051 |
| M15 | Azo-compound resin | 9.80 | 27.1 | 25.6 | 0.057 |
| M16 | Polyester resin | 9.90 | 25.9 | 25.8 | 0.061 |
| M17 | Carbon | 10.30 | 17.8 | 27.6 | 0.048 |

As is evident from TABLE 1, a directional characteristic of 25 dB or more was obtained in any of the optical power monitors M1 to M17. Especially in M1 to M5 using ceramic sleeves, a directional characteristic of 26 dB or more was obtained.

EXAMPLE 6

Figure 2:
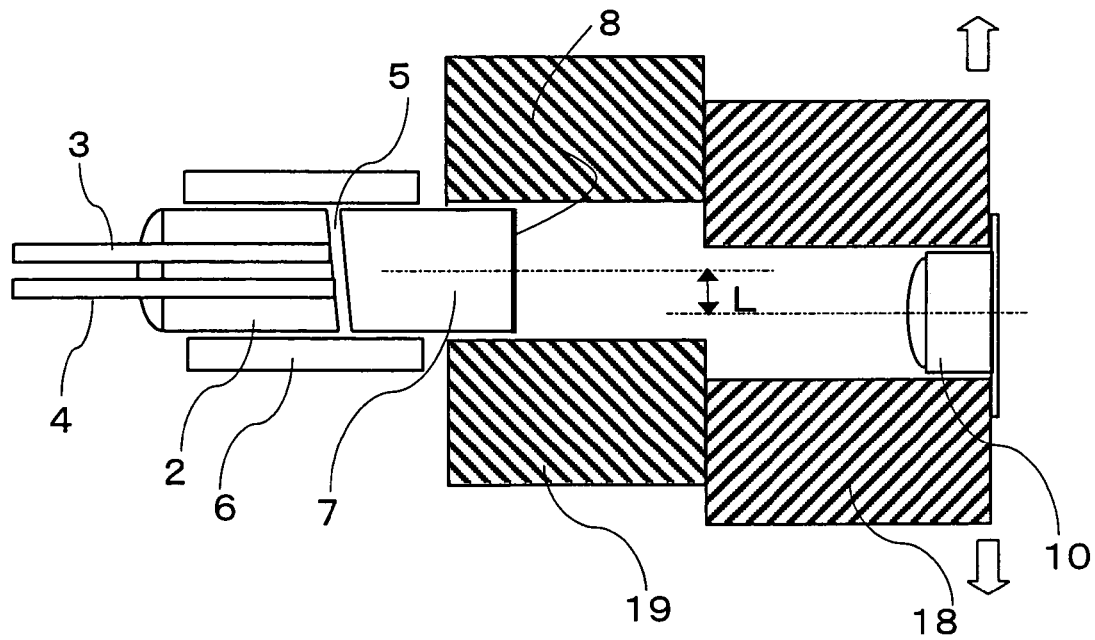
FIG. 2 is a cross-sectional drawing showing a uni-directional optical power monitor of EXAMPLE 6 according to the present invention.

Studies were made on an optical axial distance L between the optical axes of the GRIN lens and the photodiode which provides a small-sized uni-directional optical power monitor with high optical sensitivity and high directional characteristic. The uni-directional optical power monitor is an optical power monitor illustrated in FIG. 2 where only the sleeve 9 in the uni-directional optical monitor of EXAMPLE 1 was divided into two portions in the longitudinal direction. The optical power monitor was structured so as to change the optical axial distance L by relatively moving the two divided sleeves 18 and 19. The lens diameter D of the photodiode 10 is 1.9 mm. A Gauss beam radius R of the light transmitting through the tap film 8 measured with a beam profiler was 0.38 mm.

Figure 3:
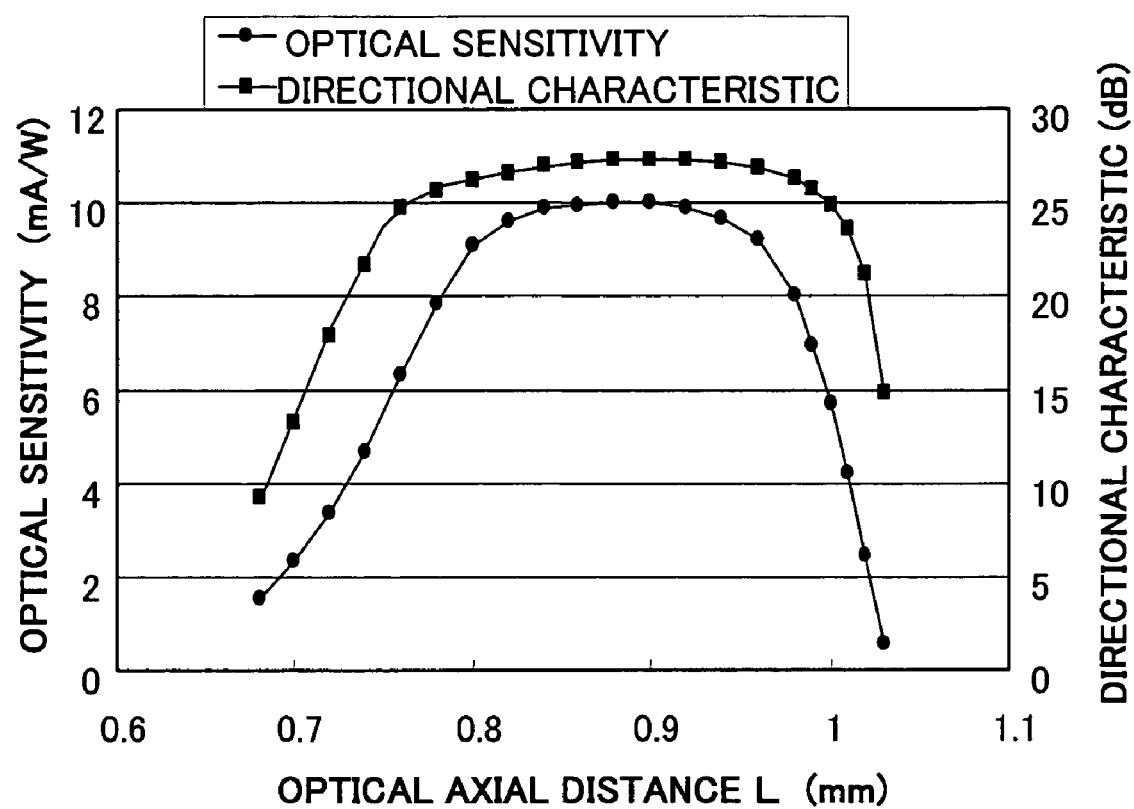
FIG. 3 is a graph showing a relationship of optical sensitivity and directional characteristic with a distance between optical axes.

FIG. 3 is a graph showing the results of optical sensitivities of the photodiode 10 and directional characteristics obtained when the light was inputted from the input optical fiber 3 while the optical axial distance L was being changed. When the optical axial distance L was set so as to be less than 0.8 mm or more than 0.95 mm, the optical sensitivities and the directional characteristics lowered. It is considered that when the optical axial distance L was smaller than a certain value, the optical sensitivities lowered because the light coming from the input optical fiber 3 hardly inputted into the photodiode 10, and the directional characteristics also lowered because the quantity of light coming from the output optical fiber 4 and detected by the photodiode 10 increased. Since the light is subjected to intensity distribution according to Gauss distribution within the beam, the optical intensity at a specific optical axial distance L can be calculated with the Gauss beam radius R. Optical detection by the photodiode with lens is limited to a case where the light is inputted into the lens of the photodiode, which indicates that there is the following relationship: $2L \geq 1.517R + D/2$, where L is an optical axial distance between the optical axes of the GRIN lens 7 and the photodiode 10 with lens, R is a Gauss beam radius of the light transmitting through the tap film 8 and D is the lens diameter of the photodiode. If values of the EXAMPLE 6 are inputted into the expression, a directional characteristic is 25 dB or more when an optical axial distance L is 0.763 mm or more.

On the other hand, as illustrated in FIG. 3, when an optical axial distance L exceeds 0.95 mm, the optical sensitivity lowers rapidly, while the directional characteristic moderately lowers within the optical axial distance L range of 0.95 to 1.0 mm. It is considered that the through-hole between the first circular hole and the second circular hole becomes small when the optical axial distance L increases and a part of the input light coming from the input optical fiber, transmitting through the tap film and guided to the lens of the photodiode, passing through the through-hole becomes small. Accordingly, the optical axial distance L is necessary to reduce to 0.95 mm or less, that is, ½ times or less the lens diameter D of the photodiode.

For the above-mentioned reason, the optical axial distance L requires to satisfy the following inequality using the Gauss beam radius R and the lens diameter D.

$$D \geq 2L \geq 1.517R + D/2$$

EXAMPLE 7

Figure 4A:
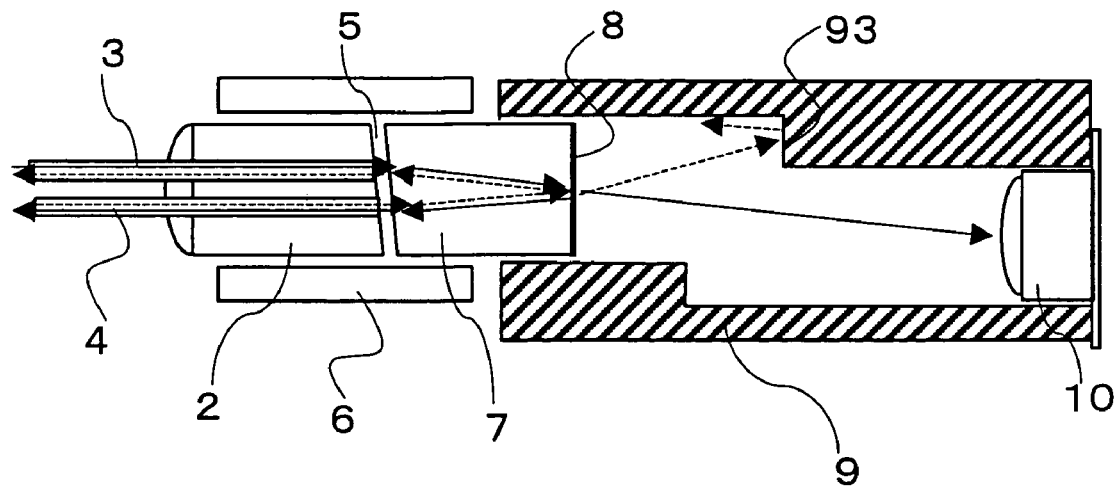
FIGS. 4A, 4B and 4C are cross-sectional drawings of a uni-directional optical power monitor of EXAMPLE 7 according to the present invention.
Figure 4B:
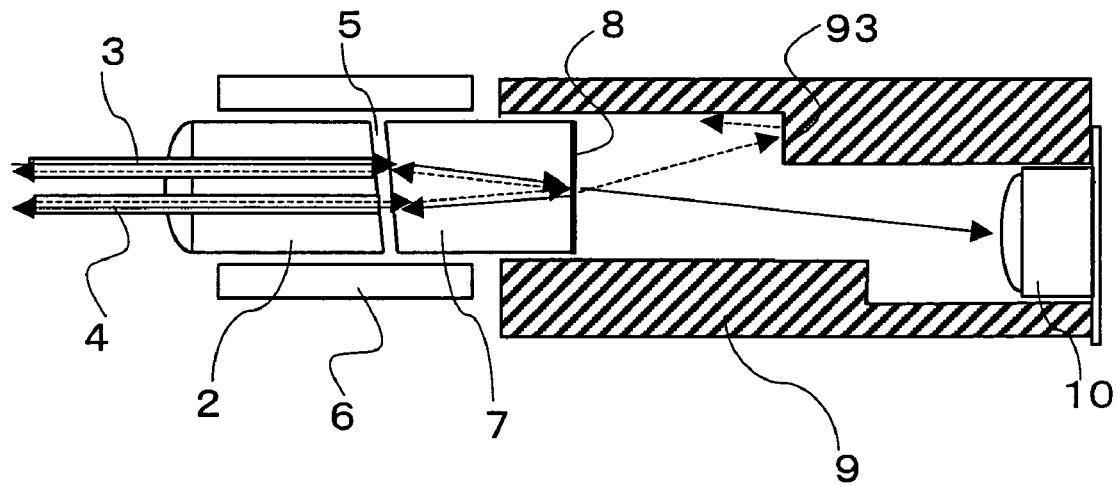
Figure 4C:
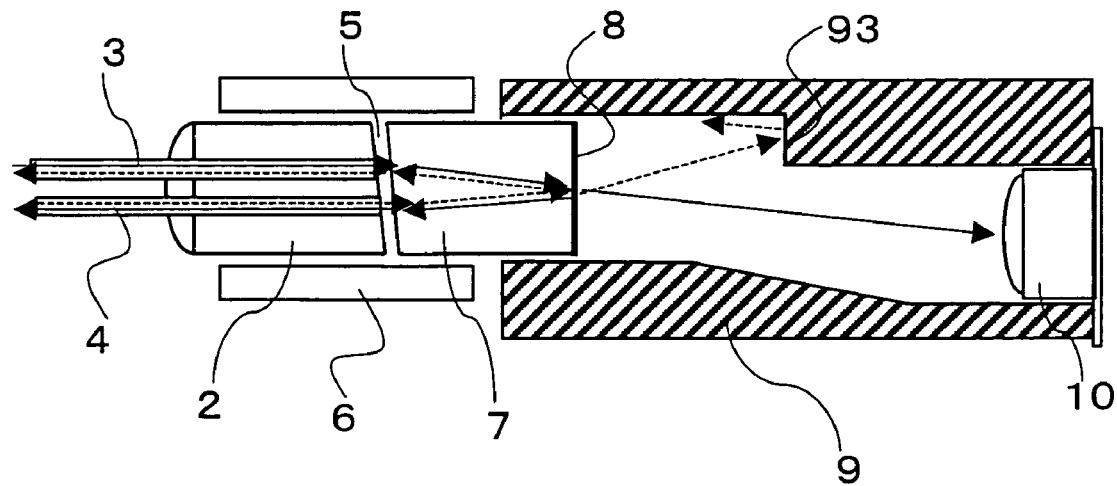

FIGS. 4A to 4C illustrate EXAMPLE 7 different in a sleeve shape from EXAMPLE 1. The intermediate wall is provided at the same position as in FIG. 1 of EXAMPLE 1 so that a part of the light (indicated by broken-line arrows) which comes from the optical fiber 4 and reaches the tap film 8 is absorbed and reflected in/on the intermediate wall. The light (indicated by solid-line arrows) coming from the optical fiber 3 and transmitting through the tap film 8 reaches the photodiode 10 through the first circular hole and the second circular hole. Since inner walls of the first circular hole and the second circular hole do not interfere with an optical path indicated by a solid-line arrow, sleeves having such shapes as illustrated in FIGS. 4A to 4C can be adopted. The sleeves 9 illustrated in FIGS. 4A and 4B were processed from both ends of a columnar black alumina ceramic with the center axes of the first circular hole and the second circular hole shifted from each other, using a diamond grinding wheel. The sleeve 9 illustrated in FIG. 4C was obtained by additionally making a circular hole using the diamond grinding wheel to the black alumina ceramic which was formed and sintered into a cylindrical shape having an incline on its inside. The directional characteristic of the uni-directional optical power monitor manufactured with the sleeves was 26.1 dB, which is the same as for EXAMPLE 1.

COMPARATIVE EXAMPLE

Figure 5:
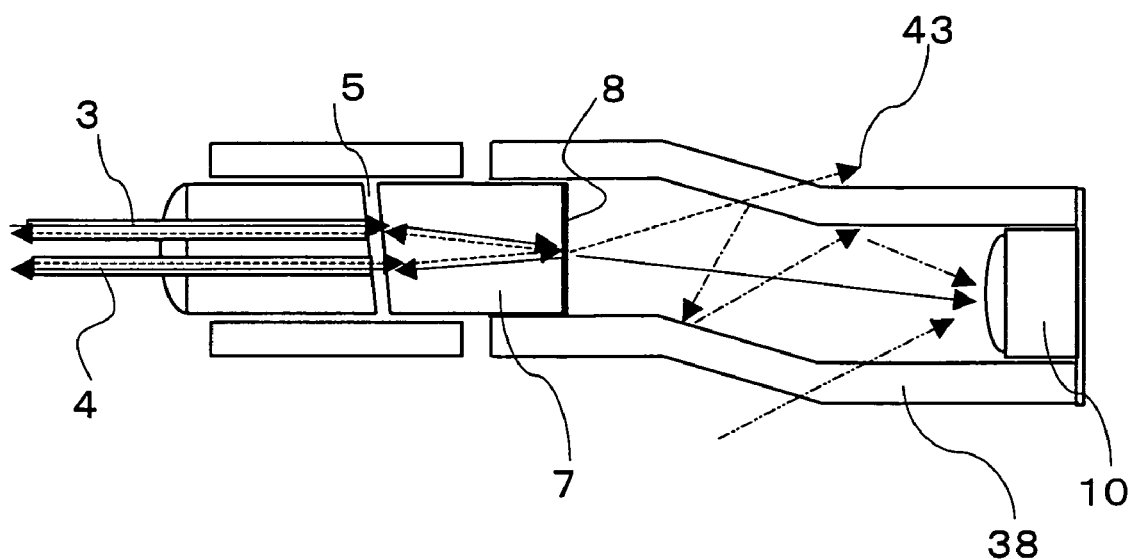
FIG. 5 is a cross-sectional drawing showing a uni-directional optical power monitor of a comparative example.
Figure 6:
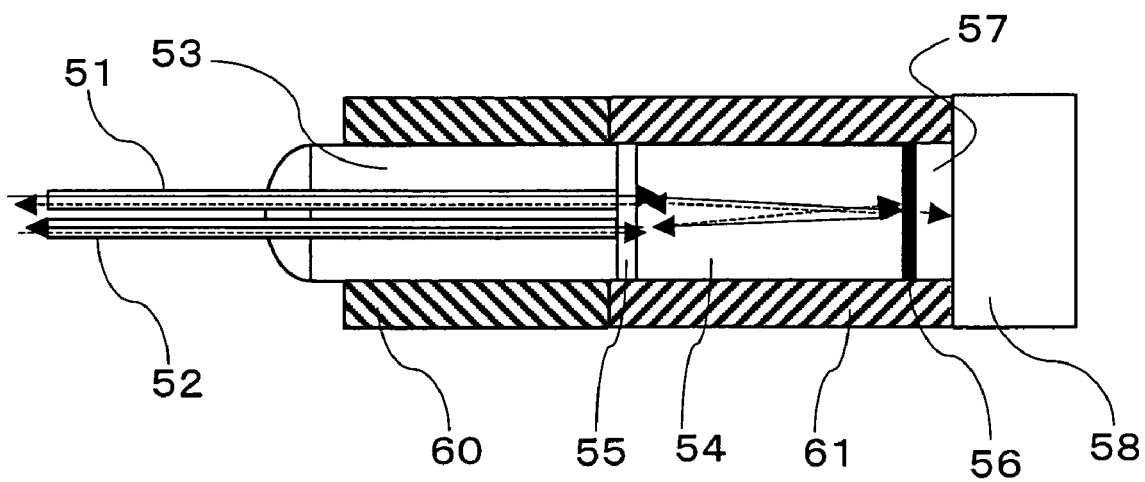
FIG. 6 is a cross-sectional drawing of a conventional bi-directional optical power monitor.
Figure 7:
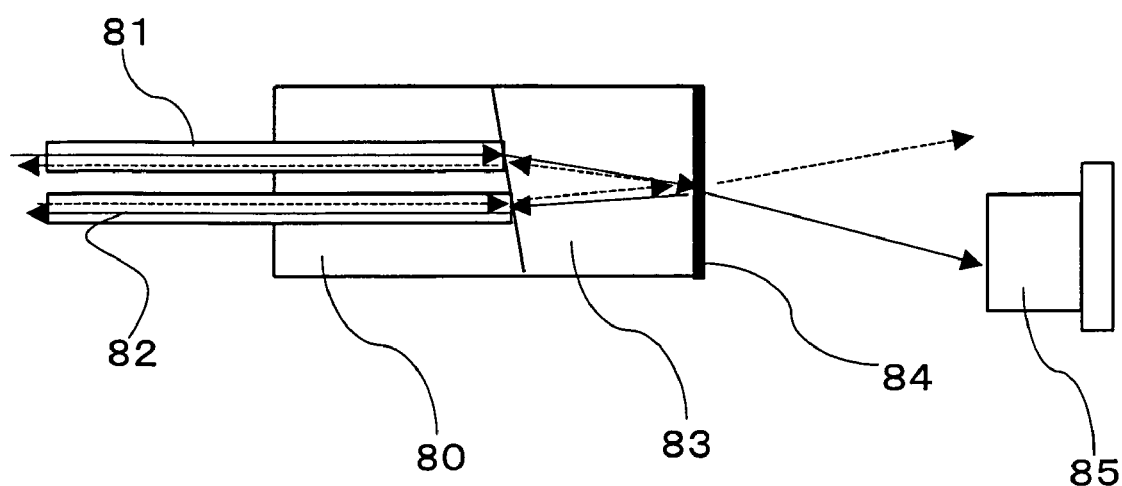
FIG. 7 is a cross-sectional drawing of a uni-directional optical power monitor shown in the Non-patent Document 1.

The uni-directional power monitor as an comparative example illustrated on a sectional view in FIG. 5 has the same structure as the uni-directional optical power monitor of EXAMPLE 1 except the structure of the sleeve. In FIG. 5, the portions using the same components as FIG. 1 have the same numerical references as those in FIG. 1. A distance between the tap film 8 of the GRIN lens 7 and the lens of the photodiode 10 is set so as to be 10 mm, which is the same as for EXAMPLE 1. A sleeve 38 connecting the GRIN lens 7 with the photodiode 10 is formed out of brown colored glass, a moderate inclination is provided approximately in the center of the glass sleeve and an optical axial distance between the axes of the GRIN lens and the photodiode is 0.9 mm.

A part of optical signals entering the GRIN lens 7 from the input optical fiber 3 transmit through the tap film 8 and are detected by the photodiode 10 as illustrated by solid-line arrows in the figure. A part of optical signals entering the GRIN lens 7 from the output optical fiber 4 and transmitting through the tap film 8 transmit through a wall of the glass sleeve 38 and are discharged to the outside of the monitor as indicated by broken-line arrows 43 in the figure, which are not detected by the photodiode 10. The directional characteristics of the uni-directional power monitor are 23 to 24 dB, which are not so satisfactory. This may be because the wall of the glass sleeve receives reflection of a part of light or allows the external light to be inputted into the sleeve, thus the light can be detected by the photodiode.

INDUSTRIAL APPLICABILITY

The present invention provides a monitoring apparatus, especially applicable to an amplification circuit having EDFA and the like, which measures the intensity of optical signals. The uni-directional optical power monitor according to the present invention detects and measures only optical signals coming from such a direction as to measure the intensity of optical signals and does not measure optical signals coming from the opposite direction, thus exactly measuring the intensity of optical signals to be measured. Furthermore, the uni-directional power monitor is of a small-sized type, thus reducing the size of the whole optical communication circuit.

The invention claimed is:

1. A uni-directional optical power monitor comprising:
   a pig tail fiber having two optical fibers parallel to each other and at a small distance from each other,
   the two optical fibers having respectively their open ends adjacent to a center of an end surface of the pig tail fiber on the end surface;
   a columnar GRIN lens having two end surfaces opposing to each other, of which one faces the end surface of the pig tail fiber and the other has a tap film on it;
   a sleeve provided with a first end and a second end,
   the sleeve having a first circular hole being continuous from the first end approximately to an intermediate position between the first end and the second end, and a second circular hole that is continuous from the second end approximately to the intermediate position and has a center axis shifted from a center axis of the first circular hole,
   the first circular hole having a through-hole communicating with the second circular hole and an intermediate wall approximately at the intermediate position; and
   a photodiode positioned at the second end of the sleeve in the second circular hole and having a lens, on a front face of the photodiode, facing to the through-hole;
   wherein the GRIN lens is positioned in the first circular hole such that an optical signal, which comes from one of the two optical fibers and transmits through the tap film, proceeds through the first and the second circular holes and reaches the photodiode and that an optical path of an optical signal coming from the other of the two optical fibers and transmitting through the tap film is obstructed by the intermediate wall of the sleeve.

2. A uni-directional optical power monitor as set forth in claim 1, wherein the sleeve and the intermediate wall are made of opaque ceramic, glass or plastic.

3. A uni-directional optical power monitor as set forth in claim 2, wherein the sleeve is black.

4. A uni-directional optical power monitor as set forth in claim 1, wherein the uni-directional optical power monitor satisfies the following equation:

$$D \geq 2L \geq 1.517R + D/2$$

wherein L is an optical axial distance between the GRIN lens and the photodiode having the lens on the front face, R is a Gauss beam radius of a light transmitting through the tap film and D is a lens diameter of the photodiode.

* * * * *